United States Patent
Zhang et al.

(10) Patent No.: US 12,372,168 B2
(45) Date of Patent: Jul. 29, 2025

(54) MULTIFUNCTIONAL MICROVALVE CAPABLE OF CONTROLLING FLOW OF FLUID, MICROFLUIDIC CHIP AND METHOD

(71) Applicant: LEADWAY (HK) LIMITED, Hong Kong (CN)

(72) Inventors: Xin Zhang, Hangzhou Zhejiang (CN); Zanbiao Peng, Hangzhou Zhejiang (CN); Yi Wang, Hangzhou Zhejiang (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 1209 days.

(21) Appl. No.: 17/046,734

(22) PCT Filed: Apr. 10, 2019

(86) PCT No.: PCT/CN2019/081993
§ 371 (c)(1),
(2) Date: Oct. 9, 2020

(87) PCT Pub. No.: WO2019/196850
PCT Pub. Date: Oct. 17, 2019

(65) Prior Publication Data
US 2021/0164587 A1 Jun. 3, 2021

(30) Foreign Application Priority Data
Apr. 11, 2018 (CN) .......................... 201810320417.4

(51) Int. Cl.
*F16K 99/00* (2006.01)

(52) U.S. Cl.
CPC ...... *F16K 99/0013* (2013.01); *F16K 99/0028* (2013.01); *F16K 2099/008* (2013.01); *F16K 2099/0084* (2013.01)

(58) Field of Classification Search
CPC ....... B01L 3/502738; B01L 2300/0874; B01L 2300/0887; B01L 2400/0644;
(Continued)

(56) References Cited

U.S. PATENT DOCUMENTS 7,842,234 B2  11/2010  Lauks et al.
8,778,282 B2   7/2014  Jung et al.
(Continued)

FOREIGN PATENT DOCUMENTS

CN    102006936 A    4/2011
CN    102202868 A    9/2011
(Continued)

OTHER PUBLICATIONS

International Search Report issued Jul. 12, 2019 in PCT/CN2019/081993 with English translation (6 pages).
(Continued)

*Primary Examiner* — Matthew D Krcha
*Assistant Examiner* — Austin Q Le
(74) *Attorney, Agent, or Firm* — Michael A. Whittaker

(57) ABSTRACT

A microvalve (8), comprising a first flow guide channel (841) for communicating with microchannels (401, 402, 403, 404) in a chip and a second flow guide channel (842) for communicating liquid storage recesses (11, 12) in the chip to the ambient atmosphere, wherein the first flow guide channel and the second flow guide channel do not communicate with each other. Also provided are a microfluidic chip (100) and a method for controlling the flow of a plurality of fluids in a microfluidic chip. The microfluidic chip (100) comprises a microvalve capable of controlling the flow of a fluid. The microfluidic chip has three position states, so as to control different fluids in the chip to sequentially flow in the chip. The microfluidic chip and the microvalve have simple structures, are convenient to assemble, are reusable, and can
(Continued)

avoid the possibility of mutual contamination between fluids.

8 Claims, 12 Drawing Sheets

(58) Field of Classification Search
CPC .............. F16K 99/0003; F16K 99/0011; F16K 99/0013; F16K 99/0028; F16K 2099/008; F16K 2099/0084
See application file for complete search history.

(56) References Cited

U.S. PATENT DOCUMENTS

| | | | |
|---|---|---|---|
| 8,985,547 | B2 | 3/2015 | Weibel et al. |
| 2006/0243934 | A1 | 11/2006 | Chung et al. |
| 2009/0029422 | A1 | 1/2009 | Hanafusa et al. |
| 2010/0144541 | A1 | 6/2010 | Murasato et al. |
| 2010/0256350 | A1 | 10/2010 | Rhee et al. |
| 2013/0156658 | A1 | 6/2013 | Shim et al. |
| 2015/0028235 | A1 | 1/2015 | Ichiki et al. |
| 2015/0041396 | A1 | 2/2015 | Kelly et al. |
| 2015/0044696 | A1* | 2/2015 | Dothie ............... F16K 99/0028 564/138 |
| 2016/0146203 | A1 | 5/2016 | Yuan |
| 2018/0128397 | A1* | 5/2018 | Lötters ............... F16K 99/0005 |

FOREIGN PATENT DOCUMENTS

| | | |
|---|---|---|
| CN | 103244734 A | 8/2013 |
| CN | 104344864 A | 2/2015 |
| CN | 106573241 A | 4/2017 |
| CN | 107096580 A | 8/2017 |
| CN | 107542973 A | 1/2018 |
| CN | 108443579 A | 8/2018 |
| CN | 208449338 U | 2/2019 |
| CN | 209354751 U | 9/2019 |
| WO | 2019196850 A1 | 10/2019 |

OTHER PUBLICATIONS

Extended European Search Report issued in EP 19785208.0 dated Nov. 24, 2021.
First Office Action issued by SIPO in CN 201810320417.4 dated Mar. 25, 2019—incl Engl lang transl (16 pages total).
Response to First Office Action submitted in CN 201810320417.4 dated Aug. 8, 2019—incl Engl lang transl (6 pages total).
Second Office Action issued by SIPO in CN 201810320417.4 dated Dec. 17, 2019—incl Engl lang transl (9 pages total).
Response to 2nd Office Action submitted in CN201810320417.4 dated Feb. 20, 2020—incl Engl lang transl (5 pages total).
First Office Action issued by SIPO in CN201820509946.4 dated Apr. 2, 2019—incl Engl lang transl (3 pages total).
International Search Report and Written Opinion issued in PCT/CN2019/081993 dated Jul. 12, 2019—incl Engl lang transl (17 pages total).
International Preliminary Report on Patentability issued in PCT/CN2019/081993 dated Oct. 13, 2020—incl Engl lang transl (13 pages total).

* cited by examiner

MULTIFUNCTIONAL MICROVALVE CAPABLE OF CONTROLLING FLOW OF FLUID, MICROFLUIDIC CHIP AND METHOD

CROSS-REFERENCE TO RELATED MATTERS

The present invention is filed under 35 U.S.C. § 371 as the U.S. national phase of International Patent Application No. PCT/CN2019/081993, filed Apr. 10, 2019, which designated the United States and claims priority to Chinese Patent Application No. 201810320417.4, filed Apr. 11, 2018, each of which is hereby incorporated in its entirety including all tables, figures and claims.

FIELD OF THE INVENTION

The present invention belongs to the technical field of medical diagnostic articles, and relates to a multifunctional microvalve capable of controlling the flow of liquid and a microfluidic chip with a built-in reagent.

BACKGROUND OF THE INVENTION

Most biochemical detection reactions are carried out in solutions. At present, there is a research trend that the volume requirements of the reaction liquid (samples to be tested and detection reagents) are getting smaller and smaller, and the test items of the same sample are more and more or the flux requirements are getting higher and higher, and can achieve the automation and controllability of experimental processes. Microfluidic chips came into being, and are more and more used because of the characteristics of controlling a smaller volume of reaction liquid, miniaturization, higher detection flux and more easiness to realize automation. The microfluidic chip includes a substrate and a microchannel network disposed in the substrate, and furthermore, through the synergistic effect of a microvalve and a power device (such as a micropump), a sample and a reaction reagent can be accurately delivered to different functional areas in the microfluidic chip to complete the detection of the sample. As a revolutionary bedside disease detection means, the microfluidic detection technology can integrate multiple detection items on a miniaturized, portable and disposable microfluidic chip.

The microvalve is an important component of the microfluidic chip, which is mainly used for controlling the precise flow of the sample to be tested and the detection reagent. In recent years, the widely used microvalve is composed of a deformable film and a valve seat. This type of microvalves includes two upper and lower substrates and a polymer film at the middle, wherein a protruding structure is disposed on the bottom substrate with a microchannel to form the valve seat. The other upper cover base material has a recessed structure at a position corresponding to the valve seat to provide a deformable hollow cavity for the film. This microvalve is closed at an initial state, at this time, the polymer film and the protruding portion of the valve seat in the microchannel are fitted with each other, and the flow channel is closed. When an external force acts on the film, the film and the valve seat are separated, and the flow channel is opened. This external force can be pneumatic (for example, US Patent Application US 2013/0156658 A1 and U.S. Pat. No. 8,778,282 B2), heated and deformed (for example, Chinese Patent Application CN 102006936 A, US Patent Application US 2006/0243934 A1 and US 2015/0028235 A1), magnetic (for example, Chinese Patent Application CN 103244734 A) and mechanical pressure (for example, U.S. Pat. No. 8,985,547 B2).

Due to the long-term contact between the film and the valve seat under normal conditions, the film and the valve seat may stick together, which may cause the phenomenon that the channel cannot be opened normally in use. Due to the existence of the protruding valve seat and the recessed hollow cavity, the thickness of the microfluidic chip is restricted, and as a result, miniaturization cannot be achieved. Opening the microvalve requires a certain external force to deform the film, and requires another external force to act on the fluid to cause the fluid to flow in the flow channel at the same time. In this way, it is difficult to control the flow of fluid precisely by controlling the two kinds of power at the same time. Secondly, after the microvalve is opened, the film is in contact with the fluid, making it impossible to restore the closed state, thereby limiting the reuse of the microvalve structure. The microvalve is limited to controlling one type of fluid, and cannot achieve the function of controlling multiple fluids at the same time, otherwise it will be impossible to avoid the problem of pollution. In the process of structural design, the method of optimizing the structure of the film can make up for the above shortcomings to a certain extent, but it also increases the difficulty of processing and assembling the microfluidic chip to a certain extent.

With the surge in market demand for in vitro diagnosis, the advantages of the microfluidic technology in in vitro diagnostic applications have gradually emerged, and have received more and more attention from the industry. Most reactions require the participation of additional reagents. However, the micro-processing technology is as immature as the microfluidic technology, therefore, the long-term storage and release of the built-in reagent in the microfluidic chip are a common technical difficulty, which limits the miniaturization of detection equipment and the development of microfluidic products to a greater extent. At present, most microfluidic products on the market use external reagent packs, such large-size multi-serve reagent packs are easier to process, but it also brings some insurmountable problems. For example, due to the use of the reagent packs, it is difficult to achieve the miniaturization of external detection equipment. Secondly, the troublesome cleaning of complex pipelines can easily lead to pollution. Again, the shelf lives of the reagent packs after opening are very short, so if the volume of the test sample is low, it is easy to cause waste. At the same time, very few chip products with built-in liquid storage functions are more difficult to process and have higher costs, which is contrary to the highlight of the low cost of the microfluidic products compared with large biochemical analyzers. For example, in the patent (U.S. Pat. No. 7,842,234, CN102202868), a liquid storage bag with a valve has very complicated processing technology and very high requirements on materials, the value can only be opened by the cooperation of multiple hardware units in the external detection instrument to release the reagent, and the product cost is much higher than those of many common products at the same time, which limits the types of application markets. Therefore, we need a more effective method to solve this problem. If a certain micro-component can control multiple fluids and seal the reagents, and the component is simple to operate and easy to process, it can effectively promote the popularity of the microfluidic products.

SUMMARY OF THE INVENTION

The present invention provides a microvalve based on the piston principle and a microfluidic chip controlled by the microvalve. On one hand, through the special design of a channel of the microfluidic chip, a pneumatic microfluidic chip can realize the sequential release of built-in liquid and sample liquid with only one valve; and on the other hand, by adding different microstructures to the valve, the functions of blocking, communicating and directional transportation of micro channels on a substrate of the microfluidic chip are achieved.

Specifically, the present invention provides a microvalve capable of controlling the flow of liquid, including a valve body, wherein the valve body includes at least two flow guide channels; and the flow guide channels do not communicate with each other. The flow guide channels on the valve body do not communicate with each other. More preferably, the flow guide channels are not connected with each other neither.

In some embodiments, each flow guide channel runs through the valve body. That is, each flow guide channel has an inlet and an outlet on an outer surface of the valve body, so that the flow guide channel communicates with the outside of the valve body.

In some preferred embodiments, each flow guide channel is located on a different plane of the valve body. The plane in the present invention refers to a plane formed by cutting the valve body horizontally or vertically or at any angle on the valve body, and not merely refers to a horizontal plane. Each flow guide channel being located on a different plane of the valve body means that each flow guide channel is located on any plane of the valve body, and after having one flow guide channel, the plane does not have other flow guide channels; and moreover, each of these planes with the flow guide channels has no intersection at the flow guide channels, thereby ensuring no communication between flow guide channels.

In some specific embodiments, the one flow guide channel has a turning design in the valve body, and two open ends of the flow guide channel are respectively located on different planes of the valve body. The turning design means that the entire flow guide channel is not located on the same plane in the valve body, but a direction change occurs, and the channel presents a corner.

In some specific embodiments, the one flow guide channel is an annular groove surrounding an outer wall of the valve body.

In some preferred embodiments, the microvalve includes a valve body, a first flow guide channel and a second flow guide channel, and the first flow guide channel and the second flow guide channel do not communicate with each other; the first flow guide channel is disposed throughout the valve body, and openings at both ends thereof are formed in the side wall of the valve body; and the second flow guide channel is designed with a corner, the first opening of the second flow guide channel is formed in the side wall of the valve body, and the second opening is formed in the bottom surface or a top surface of the valve body.

Preferably, the first flow guide channel is horizontally disposed throughout the valve body.

In some preferred embodiments, the corner design takes the shape of "7".

In some preferred embodiments, the microvalve includes a valve body, a first flow guide channel and a second flow guide channel, the first flow guide channel and the second flow guide channel are disposed in staggered layers and do not communicate with each other, the first flow guide channel and the second flow guide channel are disposed throughout the valve body, and the openings at the both ends thereof are formed in the side wall of the valve body.

Preferably, the first flow guide channel and the second flow guide channel are disposed in staggered layers without crossing, and the projections of the first flow guide channel and the second flow guide channel cross with each other.

More preferably, the first flow guide channel and the second flow guide channel are horizontally disposed throughout the valve body.

In some preferred embodiments, the microvalve further includes a force receiving portion.

The present invention also includes an application of the microvalve on the microfluidic chip.

In another aspect, the present invention further provides a microfluidic chip, including a substrate and a cover plate, and further includes a microvalve capable of controlling the flow of liquid, and a microvalve insertion hole for accommodating the microvalve; the substrate is provided with a liquid storage recess and a microchannel; the liquid storage recess and the microchannel are covered and sealed by the cover plate; the microchannel is connected with the microvalve insertion hole.

In some embodiments, the cover plate includes an upper cover plate and a lower cover plate, and the upper cover plate and the lower cover plate cover the upper surface and the lower surface of the substrate, respectively.

In some preferred embodiments, after the microvalve is inserted into the microvalve insertion hole, the microvalve moves in the microvalve insertion hole, so that the microchannel is closed or communicated, or the microchannel communicates with the atmosphere; and the microvalve moves in the microvalve insertion hole, so that the liquid in the liquid storage recess does not flow or flows into the microchannel.

Specifically, by pressing or rotating or pressing and rotating the microvalve to cause the microvalve to move in the microvalve insertion hole, the microchannel is closed or communicated, or the microchannel communicates with the atmosphere. Furthermore, by pressing or rotating or pressing and rotating the microvalve to cause the microvalve to move in the microvalve insertion hole, the liquid in the liquid storage recess does not flow or flows into the microchannel.

In some preferred embodiments, the microvalve includes at least two flow guide channels located on the valve body, the flow guide channels do not communicate with each other.

In some preferred embodiments, the microchannel has an open end in the microvalve insertion hole; and the flow guide channel on the microvalve is connected to the open end of the microchannel in the microvalve insertion hole, so that the flow guide channel on the microvalve communicates with the microchannel.

In some preferred embodiments, each flow guide channel is located on a different plane of the valve body.

In some preferred embodiments, the surface of the substrate is provided with a first liquid storage recess, a second liquid storage recess, a first microchannel connected with the first liquid storage recess, and a second microchannel, a third microchannel and a fourth microchannel, which are connected with the second liquid storage recess; the first microchannel is connected with the second microchannel and is simultaneously connected with the fourth microchannel; the other end of the fourth microchannel is connected with a negative pressure device; the microvalve insertion hole is located on the first microchannel; and the opening of one end of the third microchannel is located in the microvalve insertion hole.

In some preferred embodiments, the microvalve is provided with a first flow guide channel and a second flow guide channel, which do not communicate with each other and run through the valve body; the first flow guide channel is a linear channel; and the second flow guide channel is a turning channel.

In some preferred embodiments, the turning channel takes the shape of "7".

In some preferred embodiments, the microvalve has an initial position, a first position and a second position in the microvalve insertion hole; when the microvalve is at the initial position, the first microchannel is blocked by the microvalve to be not communicated, the third microchannel is sealed by the microvalve at the open end of the microvalve insertion hole, and the liquid in the first liquid storage recess and the second liquid storage recess cannot flow; when the microvalve is at the first position, the third microchannel is connected with the second flow guide channel of the microvalve at the open end in the microvalve insertion hole and communicates with the atmosphere, the liquid in the second liquid storage recess enters the fourth microchannel, and the liquid in the first liquid storage recess cannot flow; and when the microvalve is at the second position, the first microchannel is connected with the first flow guide channel, the liquid in the first liquid storage recess enters the first microchannel and the fourth microchannel, and the liquid in the second liquid storage recess cannot flow.

In some embodiments, the microvalve moves from the initial position to the first position and the second position in the microvalve insertion hole by pressing the microvalve to change the position of the microvalve in the microvalve insertion hole.

In some other embodiments, the microvalve moves from the initial position to the first position and the second position in the microvalve insertion hole by rotating the microvalve to change the position of the microvalve in the microvalve insertion hole.

In some other embodiments, the microvalve is located at the initial position by pressing the microvalve, and the microvalve moves from the initial position to the first position and the second position in the microvalve insertion hole by rotating the microvalve.

In some preferred embodiments, the substrate further includes a fifth microchannel; and the opening of one end of the fifth microchannel is located on the microvalve insertion hole, and the opening of the other end communicates with the atmosphere.

In some preferred embodiments, the microvalve is provided with a first flow guide channel and a second flow guide channel, which do not communicate with each other and run through the valve body; and the first flow guide channel and the second flow guide channel are disposed in staggered layers.

Preferably, the first flow guide channel and the second flow guide channel are disposed in staggered layers without crossing, and the projections of the first flow guide channel and the second flow guide channel cross with each other.

In some preferred embodiments, the microvalve has an initial position, a first position and a second position in the microvalve insertion hole; when the microvalve is at the initial position, the first microchannel is blocked by the microvalve to be not communicated, the third microchannel and the fifth microchannel are sealed by the microvalve at the open end of the microvalve insertion hole, and the liquid in the first liquid storage recess and the second liquid storage recess cannot flow into the microchannels; when the microvalve is at the first position, the third microchannel and the fifth microchannel are connected with and communicate with the second flow guide channel of the microvalve at the open end in the microvalve insertion hole, so that the third microchannel communicates with the second liquid storage recess and the atmosphere, the liquid in the second liquid storage recess enters the fourth microchannel, and the liquid in the first liquid storage recess cannot flow; and when the microvalve is at the second position, the first microchannel is connected with the first flow guide channel, the liquid in the first liquid storage recess enters the first microchannel and the fourth microchannel, and the liquid in the second liquid storage recess cannot flow.

The present invention provides a microvalve, including a valve body and two flow guide channels disposed in the valve body, wherein the flow guide channels do not communicate with each other, and the first flow guide channel is a liquid passage used for controlling the connection and disconnection of a first cavity flow path matching with the first flow guide channel; and the second flow channel is a gas passage used for controlling the connection and disconnection between a second cavity matching with the second flow channel and the external atmosphere.

In some embodiments, when the microvalve is used, one opening of the second flow guide channel communicates with the atmosphere.

In some embodiments, the first flow guide channel and the second flow guide channel are located on different planes of the valve body.

In some preferred embodiments, the second flow guide channel has a turning design in the valve body, and the two open ends of the second flow guide channel are respectively located on different surfaces of the valve body. For example, the turning design takes the shape of "7".

In some preferred embodiments, the two openings of the first flow guide channel are formed in the side wall of the valve body, the first opening of the second flow guide channel is formed in the side wall of the valve body, and the second opening of the second flow guide channel is formed in the bottom surface or the top surface of the valve body.

In some embodiments, the first flow guide channel and the second flow guide channel are disposed in the valve body in staggered layers without crossing, the first opening and the second opening of the first flow guide channel are formed in the side wall of the valve body, and the first opening and the second opening of the second flow guide channel are formed in the side wall of the valve body.

The present invention further provides a microfluidic chip, including a substrate and a cover plate, wherein the substrate is provided with a first liquid storage recess and a second liquid storage recess, the first liquid storage recess is connected with the first microchannel, the second liquid storage recess is connected with the second microchannel, a third microchannel is disposed in the substrate, and one end of the third microchannel is connected with the second liquid storage recess; a microvalve insertion hole and a microvalve for controlling the flow of the liquid in the liquid storage recesses are disposed in the substrate, and the microvalve is located in the microvalve insertion hole; the microvalve includes a valve body and at least two flow guide channels, and the flow guide channels do not communicate with each other; and the first flow guide channel is used for communicating with the microchannel in the chip, and the second flow guide channel is used for communicating the liquid storage recesses in the chip to the ambient atmosphere.

In some embodiments, the first flow guide channel of the microvalve is a liquid passage, including a first opening and a second opening, and the connection and disconnection of the flow path of the first microchannel are controlled by connecting the first opening and the second opening with the first microchannel or not; the second flow guide channel is a gas passage, including a first opening and a second opening, the connection and disconnection of the second liquid storage recess with the ambient atmosphere are controlled by connecting the first opening of the second flow guide channel with the third microchannel or not, and the second opening of the second flow guide channel is in direct contact with the ambient atmosphere or is in contact with the ambient atmosphere through the fifth microchannel.

The microvalve has at least three position states in the chip; the first state is: the first opening and the second opening of the first flow guide channel do not communicate with the first microchannel, and the first opening of the second flow guide channel does not communicate with the third microchannel; the second state is: the first opening and the second opening of the first flow guide channel communicate with the first microchannel, and the first opening of the second flow guide channel does not communicate with the third microchannel; and the third state is: the first opening and the second opening of the first flow guide channel do not communicate with the first microchannel, and the first opening of the second flow guide channel communicates with the third microchannel.

In some embodiments, under the effect of negative pressure, when the first opening and the second opening of the first flow guide channel are connected with the first microchannel to form a fluid channel, the liquid in the first liquid storage recess flows out from the first microchannel, the first opening of the second flow guide channel is not connected with the third microchannel, the second liquid storage recess does not communicate with the ambient atmosphere, and the liquid in the second liquid storage recess cannot flow out from the second microchannel; and when the first opening and the second opening of the first flow guide channel do not communicate with the first microchannel, the first microchannel is in a disconnected state, the first opening of the second flow channel is connected with the third microchannel, the second liquid storage recess communicates with the ambient atmosphere, and the liquid in the second liquid storage recess flows out from the second microchannel.

In some embodiments, the second flow guide channel has a turning design in the valve body, and the two open ends of the second flow guide channel are respectively located on different surfaces of the valve body. For example, the turning design takes the shape of "7".

In some preferred embodiments, the two openings of the first flow guide channel are formed in the side wall of the valve body for communicating with the microchannels in the chip; the first opening of the second flow guide channel is formed in the side wall of the valve body, and the second opening of the second flow guide channel is formed in the bottom surface or top surface of the valve body, and is not used for communicating with the microchannels in the chip.

In some embodiments, the first flow guide channel and the second flow guide channel are disposed in staggered layers without crossing, the first opening and the second opening of the first flow guide channel are formed in the side wall of the valve body, and the first opening or the second opening of the second flow guide channel is formed in the side wall of the valve body.

The present invention further provides a method for controlling the flow of a plurality of fluids in a microfluidic chip, including:

(1) providing the microfluidic chip, wherein the microfluidic chip includes a substrate and a cover plate, the substrate is provided with a first liquid storage recess and a second liquid storage recess, the first liquid storage recess is connected with a first microchannel, the second liquid storage recess is connected with a second microchannel, a third microchannel is disposed in the substrate, and one end of the third microchannel is connected with the second liquid storage recess; a microvalve insertion hole and a microvalve for controlling the flow of the liquid in the liquid storage recesses are disposed in the substrate, and the microvalve is located in the microvalve insertion hole; the microvalve includes a valve body and at least two flow guide channels, and the flow guide channels do not communicate with each other; and the first flow guide channel is used for communicating with the microchannel in the chip, and includes a first opening and a second opening, and the connection and disconnection of the flow path of the first microchannel are controlled by connecting the first opening and the second opening with the first microchannel or not; and the second flow guide channel is used for communicating the liquid storage recesses in the chip with the ambient atmosphere, and includes a first opening and a second opening, the connection and disconnection of the second liquid storage recess with the ambient atmosphere are controlled by connecting the first opening of the second flow guide channel with the third microchannel or not, and the second opening of the second flow guide channel is in direct contact with the ambient atmosphere or is in contact with the ambient atmosphere through another channel;

(2) causing the first opening and the second opening of the first flow guide channel of the microvalve to not communicate with the first microchannel, the first opening of the second flow guide channel to not communicate with the third microchannel, and respectively storing liquid in the first liquid storage recess and the second liquid storage recess; and (3) adjusting the microvalve to make the first microchannel form a liquid passage to enable the liquid in the first liquid storage recess to flow out, or the second liquid storage recess to communicate with the ambient atmosphere to enable the liquid in the second liquid storage recess to flow out.

In some embodiments, the method of the step (3) includes one of the following steps a or b: the step a includes: connecting the first microchannel and the second microchannel to a negative pressure device, adjusting the microvalve so that the first opening and the second opening of the first flow guide channel communicate with the first microchannel, and the first opening of the second flow guide channel does not communicate with the third microchannel, opening the negative pressure device to make the liquid in the first liquid storage recess flow out from the first microchannel, and then adjusting the microvalve so that the first opening and the second opening of the first flow guide channel do not communicate with the first microchannel, and the first opening of the second flow guide channel communicates with the third microchannel, and the liquid in the second liquid storage recess flows out from the second microchannel; or, the step b includes: connecting the first microchannel and the second microchannel with the negative pressure device, adjusting the microvalve so that the first opening and the second opening of the first flow guide channel do not communicate with the first microchannel, and the first opening of the second flow guide channel communicates with the third microchannel, opening the negative pressure device to make the liquid in the second liquid storage recess flow out from the second microchannel, and then adjusting the microvalve so that the first opening and the second opening of the first flow guide channel communicate with the first microchannel, and the first opening of the second flow guide channel does not communicate with the third microchannel, and making the liquid in the first liquid storage recess flow out from the first microchannel.

In some embodiments, the first microchannel and the second microchannel are respectively connected with one end of a fourth microchannel, and the other end of the fourth microchannel is used for connecting the negative pressure device.

In some embodiments, the second flow guide channel has a turning design in the valve body, and the two open ends of the second flow guide channel are respectively located on different surfaces of the valve body.

In some embodiments, the two openings of the first flow guide channel are formed in the side wall of the valve body, and the first opening of the second flow guide channel is formed in the side wall of the valve body, and the second opening of the second flow guide channel is formed in the bottom surface or top surface of the valve body.

In some embodiments, the first flow guide channel and the second flow guide channel are disposed in staggered layers without crossing, the first opening and the second opening of the first flow guide channel are formed in the side wall of the valve body, and the first opening or the second opening of the second flow guide channel is formed in the side wall of the valve body.

Beneficial Effects

According to the present invention, the regulation and control of multiple fluids can be realized by the design of the flow guide channels of the microvalve and the microchannels on the substrate, and the reagents can also be hermetically stored in the chip for a long time. The sharing of the flow guide channels is effectively avoided, so that the possibility of mutual contamination between the fluids can be reduced. In addition, in terms of the structural design of the microchannels, the present invention can control the flow of the liquid by changing the ventilation condition and can also seal the fluid in the chip, and combined with the basic structure of the microvalve, the feature of multiple functions of one valve is realized. The design overcomes the problem of aging and adhesion of traditional film valves, also overcomes the disadvantages of increasing the thickness of the chip due to the presence of the valve seat, and can also be used to seal reagents in the chip for a long time. These features greatly simplify the steps and external hardware equipment required in the entire fluid control.

The microfluidic chip design and the microfluidic microvalve of the present invention have the characteristics of simple structure, convenient assembly, reusability and the like, and the structure can be used for long-term effective sealing of the detection reagent in the microfluidic chip. Furthermore, according to the present invention, the microvalve has the functions of being easily opened and restored to the closed state, being capable of forming long-term contact with chemical reagents, and being easy to operate. Different flow guide channels are added to the piston of the microvalve to achieve the functions of blocking, communicating and directional transportation of the microchannels on the substrate of the microfluidic chip. This type of microvalves has the characteristics of simple structure, convenient assembly, reusability and the like. Compared with the original microvalve designs, the structure described in the present invention can be used for long-term effective sealing of the detection reagent in the chip, the microvalve can be opened and closed for multiple times through the control of a mechanical force, and the microvalve can control multiple channels and the flow of multiple fluids via the internal channel design.

The present invention further utilizes the control of the ventilation condition to realize the sequential release of the built-in liquid and the sample liquid in the pneumatic microfluidic chip just by using one valve. The flow guide channels of the microvalve do not cross, so that there is no sharing of the microchannels, thereby avoiding the possibility of mutual contamination between different fluids. Combined with the basic structure of a rotary microvalve, the feature of multiple functions of one valve is realized. The steps and external hardware equipment required in the entire fluid control are greatly simplified.

BRIEF DESCRIPTION OF THE DRAWINGS

FIG. 5-1 is one schematic diagram of an initial state of a microvalve structure in the present invention.

FIG. 5-2 is a sectional view of an A-A direction in FIG. 5-1.

FIG. 6-1 is a schematic diagram of a liquid adding state of the microvalve in FIG. 5-1.

FIG. 6-2 is a sectional view of the A-A direction in FIG. 6-1.

FIG. 7-1 is a schematic diagram of a sample adding state of the microvalve in FIG. 5-1.

FIG. 7-2 is a sectional view of the A-A direction in FIG. 7-1.

FIG. 8-1 is a schematic diagram of an initial state of another microvalve structure in the present invention.

FIG. 8-2 is a sectional view of the A-A direction in FIG. 8-1.

FIG. 9-1 is a schematic diagram of the liquid adding state of the microvalve in FIG. 8-1.

FIG. 9-2 is a sectional view of the A-A direction in FIG. 9-1.

FIG. 10-1 is a schematic diagram of the sample adding state of the microvalve in FIG. 8-1.

FIG. 10-2 is a sectional view of the A-A direction in FIG. 10-1.

FIG. 11-1 is a schematic diagram of another microfluidic chip in the present invention.

FIG. 11-2 is a schematic diagram of an upper side face of a substrate of the microfluidic chip in FIG. 11-1.

FIG. 11-3 is a schematic diagram of a lower side face of the substrate of the microfluidic chip in FIG. 11-1.

FIG. 11-4 is a schematic diagram of the microfluidic chip in FIG. 11-1 after an upper cover plate is removed.

FIG. 13-1 is a schematic diagram of an initial state of the microvalve in FIG. 12.

FIG. 13-2 is a sectional view of the A-A direction in FIG. 13.

FIG. 14-1 is a schematic diagram of the liquid adding state of the microvalve in FIG. 12.

FIG. 14-2 is a sectional view of the A-A direction in FIG. 14-1.

FIG. 15-1 is a schematic diagram of the sample adding state of the microvalve in FIG. 12.

FIG. 15-2 is a sectional view of the A-A direction in FIG. 15-1.

FIG. 16-1 is a schematic diagram of the upper side face of the substrate with a fifth microchannel.

FIG. 16-2 is a schematic diagram of the lower side face of the substrate with the fifth microchannel.

FIG. 16-3 is a schematic diagram of the substrate with the fifth microchannel after the upper cover plate is removed.

FIG. 18-1 is a schematic diagram of the initial state of the microvalve in FIG. 17.

FIG. 18-2 is a sectional view of the A-A direction in FIG. 18-1.

FIG. 19-1 is a schematic diagram of the liquid adding state of the microvalve in FIG. 17.

FIG. 19-2 is a sectional view of the A-A direction in FIG. 19-1.

FIG. 20-1 is a schematic diagram of the sample adding state of the microvalve in FIG. 17.

FIG. 20-2 is a sectional view of the A-A direction in FIG. 20-1.

DETAILED DESCRIPTION OF THE EMBODIMENTS

In the following detailed description, the reference texts attached to the drawings are a part herein, which is illustrated by way of examples of specific solutions that the present invention may implement. We do not exclude that the present invention can also implement other specific solutions and change the structure of the present invention without violating the application range of the present invention.

Figure 1:
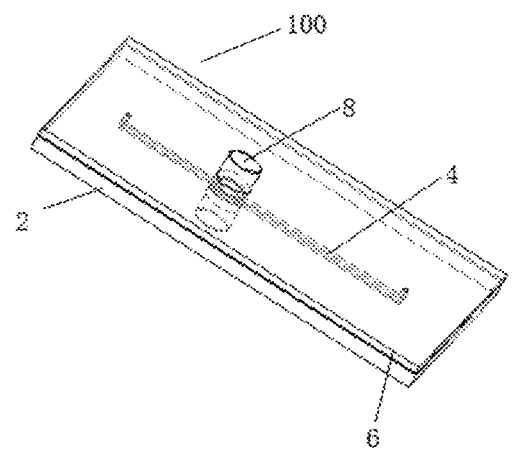
FIG. 1 is one structural schematic diagram of a microfluidic chip in the present invention.
Figure 2:
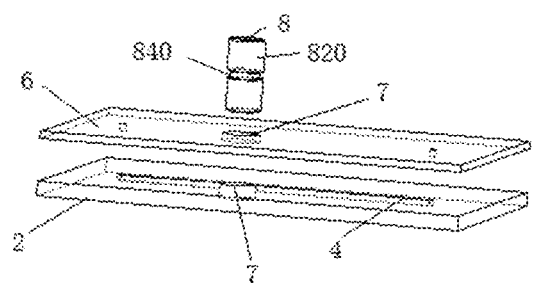
FIG. 2 is an exploded view of FIG. 1.
Figure 3:
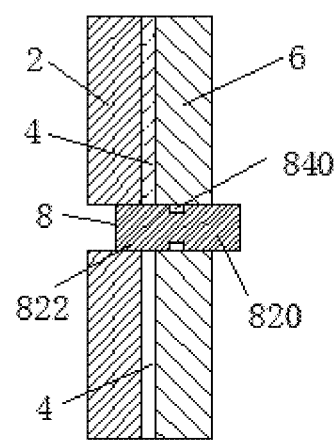
FIG. 3 is a schematic diagram in which a microvalve blocks the communication of a microchannel.
Figure 4:
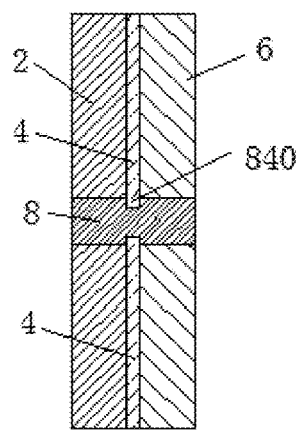
FIG. 4 is a schematic diagram of microvalve connecting microchannel

As shown in FIG. 1, FIG. 2, FIG. 3 and FIG. 4, a microfluidic chip 100 includes a substrate 2, a microchannel 4 disposed on the substrate, and a cover plate 6 covering the substrate, a microvalve 8 for controlling the connection and disconnection of the microchannel 4 is disposed at the extension location of the microchannel 4, and a microvalve insertion hole 7 for installing the microvalve is formed in the chip for opening or blocking the microchannel 4. The microvalve 8 includes a valve body 820 and a flow guide channel 840 disposed on a piston. In the embodiment shown in FIG. 3 to FIG. 4, the microvalve is a push-type microvalve, and the flow guide channel 840 is an annular groove surrounding an outer wall of the valve body. As shown in FIG. 3, when a non-flow guide portion 822 of the valve body 820 is located on the passage of the microchannel 4, the valve body blocks and seals the microchannel 4, so that fluid cannot flow in the microchannel 4. As shown in FIG. 4, when the flow guide channel 840 of the microvalve 8 is located on the passage of the microchannel 4, the microchannel 4 previously sealed by the non-flow guide portion of the piston is communicated, and the fluid flows in the microchannel 4 through the flow guide channel 840 of the microvalve. In the present embodiment, the microvalve moves perpendicular to the direction of the substrate under the action of an external force.

Figures 1, 5:
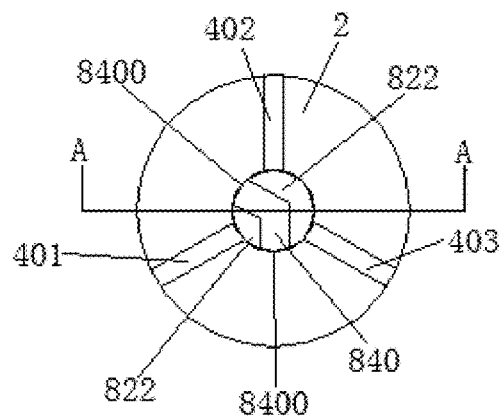
Figures 2, 5:
Figures 1, 6:
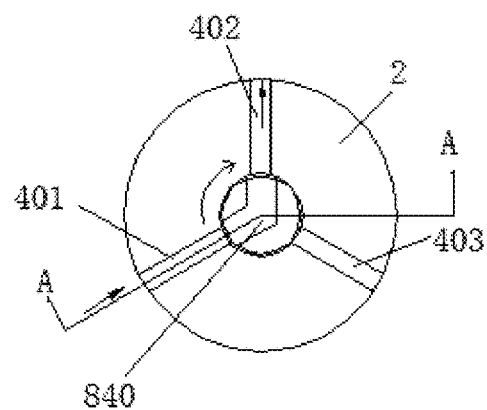
Figures 2, 6:
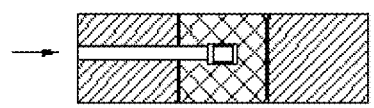
Figures 1, 7:
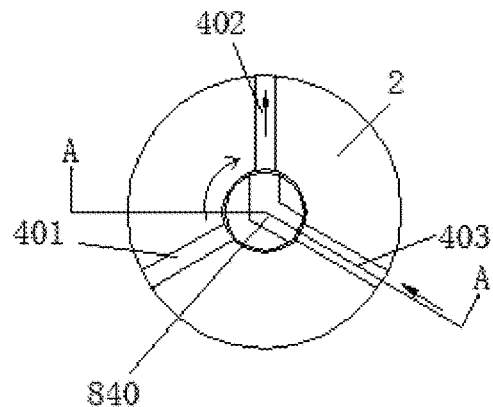
Figures 2, 7:

In some other embodiments, in the microfluidic chip shown in FIG. 5-1 to FIG. 7-2. Microchannels 401, 402, 403 distributed in three equal parts are disposed on the same plane of the substrate 2, and the microvalve 8 is disposed at the intersection of the three microchannels. The microvalve 8 includes a valve body, and the flow guide channel 840 in the valve body is a through hole with an included angle of 120 degrees. An opening 8400 of the flow guide channel 840 and the microchannels on the substrate are located in one plane, and the microvalve can rotate in a valve hole under the action of the external force, so as to block or close the circulation between any two microchannels on the substrate. As shown in FIG. 5-1 and FIG. 5-2, it is an initial position of the microvalve of the microfluidic chip, the opening 8400 of the flow guide channel of the microvalve is not connected with any one of the microchannels 401, 402, 403, so the non-flow guide portion 822 of the microvalve seals the microchannels 401, 402, 403, so that the fluid cannot flow among the three microchannels. At the state shown in FIG. 6-1 and FIG. 6-2, the microvalve rotates 60 degrees clockwise under the action of the external force, at this time, the opening 8400 of the flow guide channel of the microvalve respectively communicates with the microchannels 401 and 402, while the non-flow guide portion 822 of the microvalve seals the microchannel 403, so that the fluid flows between the microchannels 401 and 402. At the state shown in FIG. 7-1 and FIG. 7-2, the microvalve continues to rotate 60 degrees clockwise under the action of the external force, at this time, the opening 8400 of the flow guide channel respectively communicates with the microchannels 402 and 403, while the non-flow guide portion 822 of the microvalve seals the microchannel 401, so that the fluid flows between the microchannels 402 and 403. In the above embodiment, the microchannel 401 can be used as a standard liquid channel, and the microchannel 403 can be used as a to-be-tested sample channel. When the microfluidic chip is at the state in FIG. 6-1, the standard liquid flows into the microchannel 402 from the microchannel 401 through the flow guide channel 840, and enters a detection reaction chamber through the microchannel 402. When the microfluidic chip is at the state shown in FIG. 7-1, the standard liquid channel is closed, and the sample to be tested is added to the microchannel 403, the sample to be tested flows through the microchannel 403 and the flow guide channel 840, then flows into the microchannel 402, and enters the reaction chamber through the microchannel 402.

Figures 1, 8:
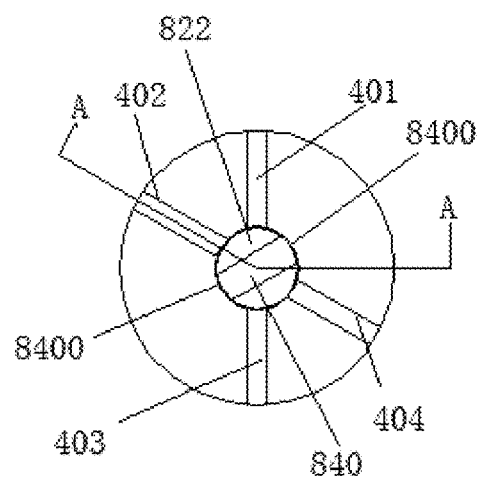
Figures 2, 8:
Figures 1, 9:
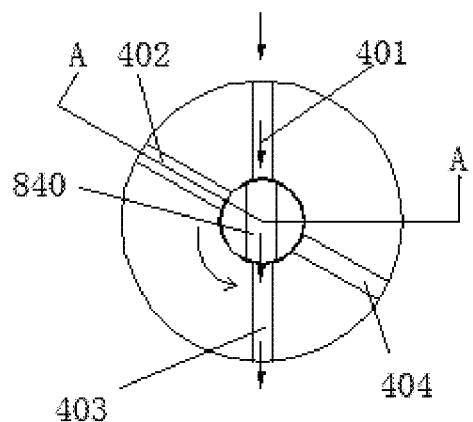
Figures 2, 9:
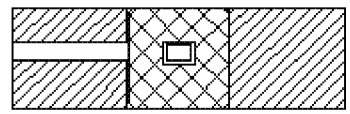
Figures 1, 10:
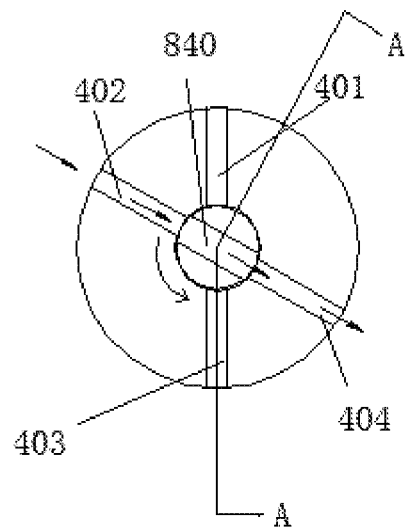
Figures 2, 10:
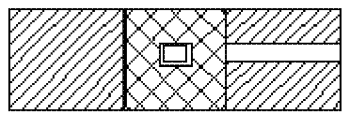

In some other embodiments, as shown in FIG. 8-1 to FIG. 10-2, four microchannels 401, 402, 403, 404 are disposed on the same plane of the substrate 2 of the microfluidic chip, and the microvalve 8 is disposed at the intersection of the four microchannels. The microvalve 8 includes a valve body, the flow guide channel 840 in the valve body is a linear through hole running through the valve body, the opening 8400 of the flow guide channel and the microchannels on the substrate are located in one plane, and the microvalve can rotate in the valve hole under the action of the external force, so as to block or close the circulation between two microchannels on two opposite sides on the substrate. As shown in FIG. 8-1 and FIG. 8-2, it is the initial position of the microvalve of the microfluidic chip, the opening 8400 of the flow guide channel of the microvalve is not connected with any one of the microchannels 401, 402, 403, 404, so the non-flow guide portion 822 of the microvalve seals the microchannels 401, 402, 403, 404, so that the fluid cannot flow among the four microchannels. At the state shown in FIG. 9-1 and FIG. 9-2, the microvalve rotates 60 degrees counterclockwise under the action of the external force, at this time, the flow guide channel 840 of the microvalve respectively communicates with the microchannels 401 and 403, while the non-flow guide portion of the microvalve seals the microchannels 402 and 404, so that the fluid flows between the microchannels 401 and 403. At the state shown in FIG. 10-1 and FIG. 10-2, the microvalve rotates 60 degrees counterclockwise again under the action of the external force, at this time, the flow guide channel 840 of the microvalve respectively communicates with the microchannels 402 and 404, while the non-flow guide portion seals the microchannels 401 and 403, so that the fluid flows between the microchannels 402 and 404. In the present embodiment, the microchannel 402 can be used as the channel of the standard liquid, and the microchannel 401 can be used as the to-be-tested sample channel. When the microfluidic chip is at the state in FIG. 9-1, the sample to be tested is added into the microfluidic chip from the microchannel 401, flows into the microchannel 403 through the flow guide channel 840 and enters the subsequent reaction chamber through the microchannel 403. When the microfluidic chip is at the state shown in FIG. 10-1, a sample adding channel is closed, the standard liquid is added into the microchannel 423, and the standard liquid flows into the microchannel 404 through the flow guide channel 840, and enters the reaction chamber through the microchannel 404.

The present invention further provides a microfluidic chip 100 and a microvalve as shown in FIG. 11-1 to FIG. 20-2. The microfluidic chip includes a substrate 2, and an upper cover plate 62 and a lower cover plate 64, which respectively cover the upper surface and the lower surface of the substrate. A liquid storage recess and a microchannel are respectively formed in the surface of the substrate in the present embodiment, and after the upper cover plate and the lower cover plate are respectively bonded to the substrate, the liquid storage recess and the microchannel form a closed liquid storage cavity or a microchannel.

Figures 1, 11:
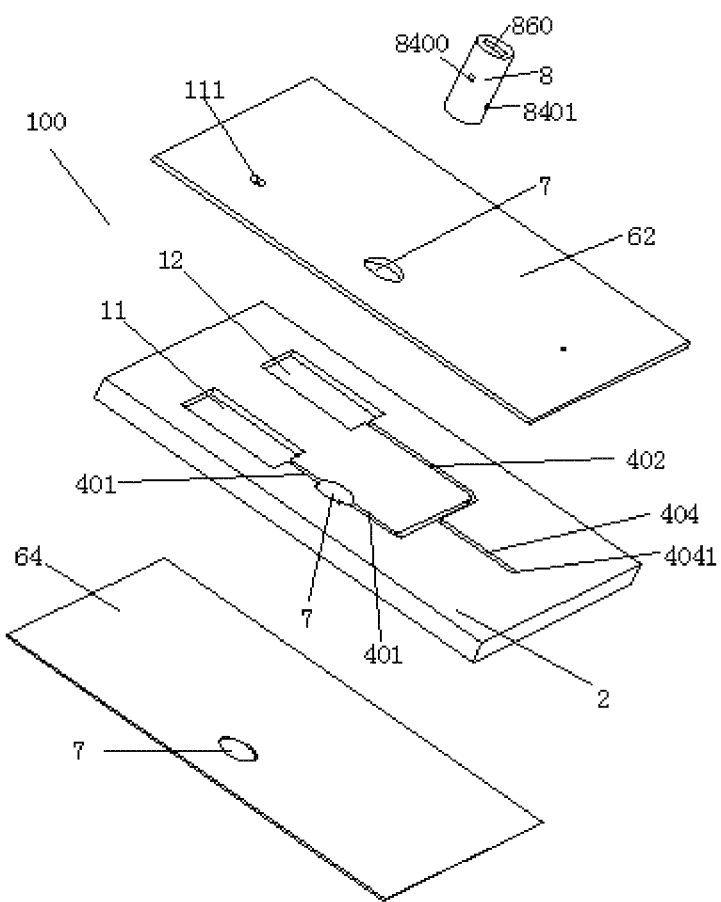
Figures 2, 11:
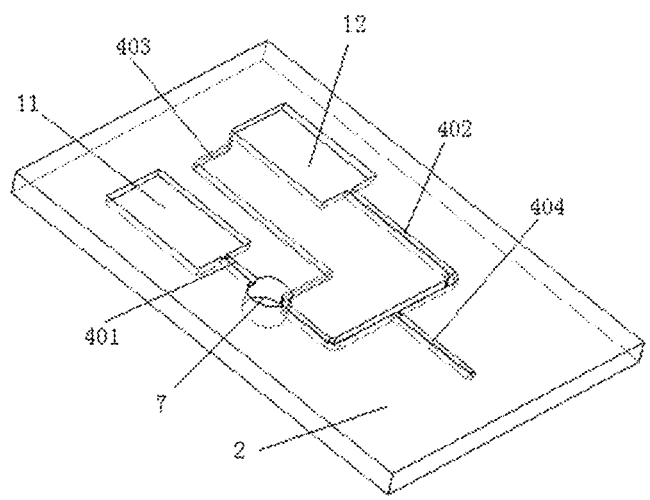
Figures 3, 11:
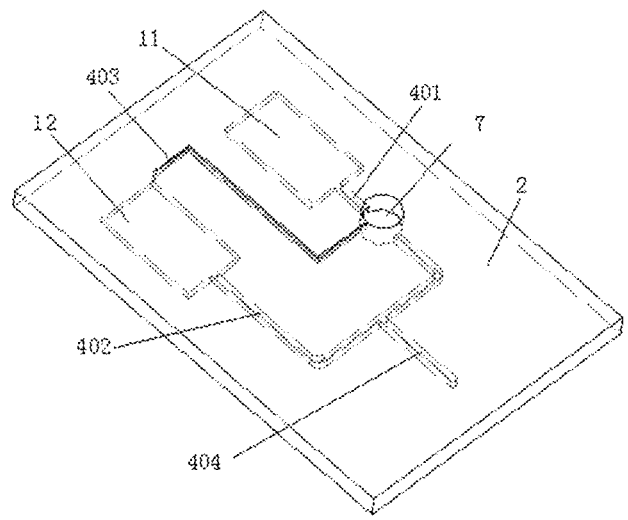
Figures 4, 11:
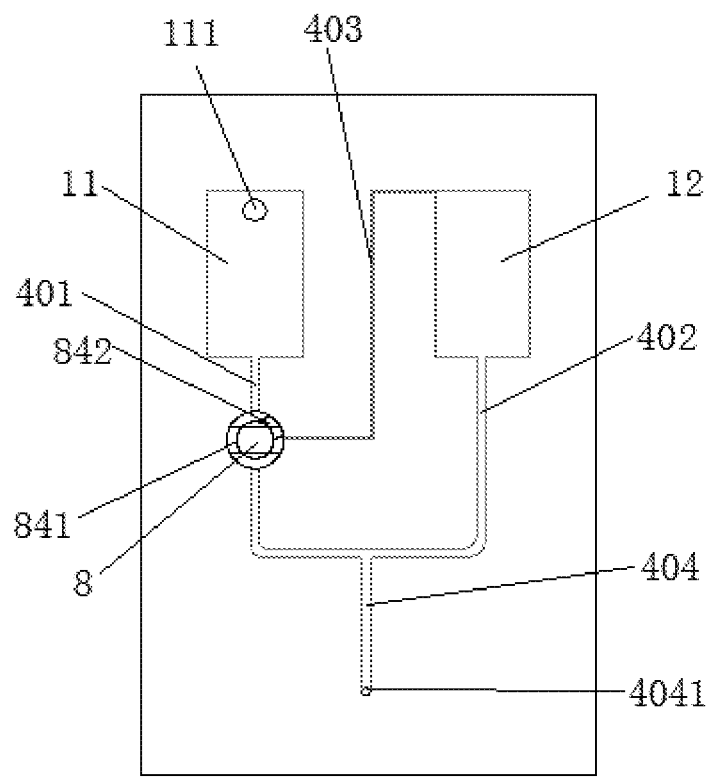

As shown in FIG. 11-1 to FIG. 11-4, a first liquid storage recess 11, a second liquid storage recess 12, a first microchannel 401, a second microchannel 402 and a fourth microchannel 404 are formed in the upper side face of the substrate, and these liquid storage recesses and these microchannels do not run through the lower surface of the substrate. The microvalve 8 is provided with a first flow guide channel and a second flow guide channel on the valve body. A microvalve insertion hole 7 running through the substrate 2 and the upper and lower cover plates 62, 64 is formed in the passage of the first microchannel 401, and the micro valve insertion hole 7 divides the first microchannel 401 into two parts. One end of the first part of the first microchannel 401 communicates with the first liquid storage recess 11, the opening at the other end is located in the microvalve insertion hole 7, and when the microvalve 8 in the insertion hole 7 is at a certain position (second position), the opening at the other end of the first part of the first microchannel 401 can form butt joint with and communicate with the opening 8400 of the first flow guide channel 841 of the microvalve 8, and at this time, the other opening 8400 of the first flow guide channel 841 communicates with the second part of the first microchannel 401. One end of the second microchannel 402 communicates with the second liquid storage recess 12, and the other end of the first microchannel 401 and the other end of the second microchannel 402 communicate with the fourth microchannel 404, respectively. A third microchannel 403 is formed in the lower side face of the substrate 2, and the third microchannel neither runs through the upper surface of the substrate, nor is directly connected with the first liquid storage recess 11 or the microchannels 401, 402, 404. The third microchannel 403 is a ventilation channel of the second liquid storage recess, one end of which communicates with the second liquid storage recess 12, the opening at the other end of which faces the microvalve insertion hole 7, and when the microvalve 8 in the insertion hole is at a certain position (first position), the opening at the other end of the third microchannel 403 forms butt joint with and communicates with the first opening 8401 of the second flow guide channel 842 of the microvalve, so that the second liquid storage recess can communicate with the atmosphere. An exhaust port 4041 at the tail end of the fourth microchannel 404 is connected with a power device to provide a negative pressure environment for the microchannels 401-404, thereby providing directional flowing power for the fluid in the first liquid storage recess and the second liquid storage recess. Therefore, the microvalve 8 is used for controlling the flow of the fluid in the first liquid storage recess 11 and the second liquid storage recess, and can control the connection and disconnection of the second liquid storage recess with the atmosphere. An insertion holes 7 are formed in locations opposite to the microvalve insertion hole on the upper cover plate and the lower cover plate.

Figures 1, 13:
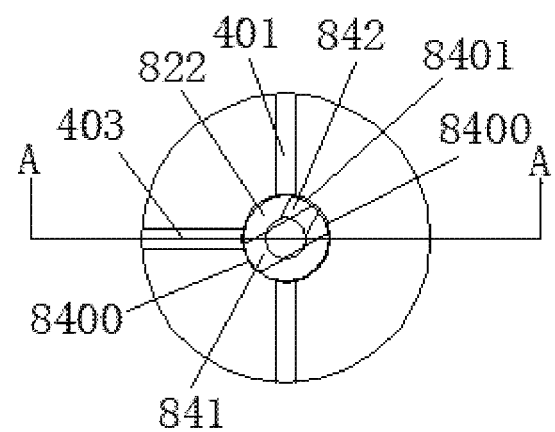
Figures 2, 13:
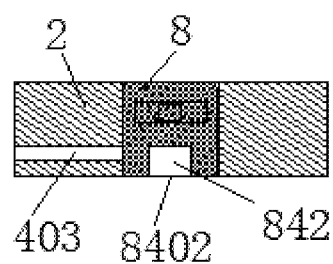

As shown in FIG. 12 to FIG. 15-2, the microvalve 8 includes a valve body 820, a first flow guide channel 841 and a second flow guide channel 842, and the first flow guide channel and the second flow guide channel do not cross or communicate with each other. The first flow guide channel 841 is horizontally disposed throughout the valve body, and the openings 8400 at both ends thereof are formed in the side wall of the valve body. When the microvalve is at a certain position (second position), the opening 8400 of the first flow guide channel 841 is connected with the first microchannel 401, so that the first microchannels separated by the microvalve communicate with each other through the first flow guide channel 841. The second flow guide channel 842 has a corner design, for example, a shape similar to "7", the first opening 8401 of the second flow guide channel 842 is formed in the side wall of the valve body, and the second opening 8402 is formed in the bottom surface or top surface of the valve body. When the microvalve is located at a certain position (first position), the first opening 8401 of the second flow guide channel 842 communicates with the third microchannel 403, at this time, the ambient atmosphere can pass through the second opening 8402 of the second flow guide channel and enter the second liquid storage recess 12 through the flow guide channel 842 and the first opening 8401. More specifically:

When the microvalve is at the initial position state shown in FIG. 13-1 and FIG. 13-2, the first microchannel 401 and the third microchannel 403 are blocked by the non-flow guide portion 822 of the valve body and are both in the closed state, at this time, in the negative pressure environment (a pump at the fourth channel 404 or other power devices that can provide negative pressure are turned on), since the second liquid storage recess 12 does not communicate with the outside and is in vacuum, the liquid in the second liquid storage recess 12 cannot flow, the first microchannel 401 of the first liquid storage recess is blocked by the microvalve, so that the fluid in the first liquid storage recess cannot flow to the fourth microchannel neither.

Figures 1, 14:
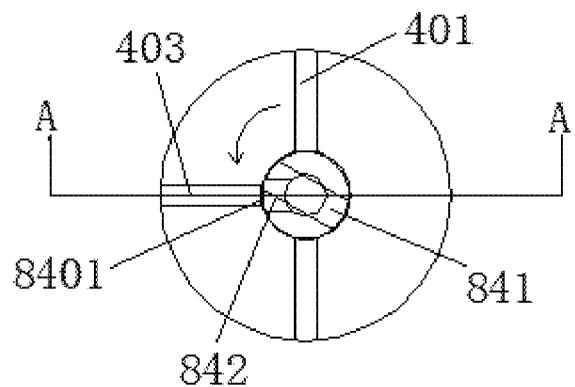
Figures 2, 14:
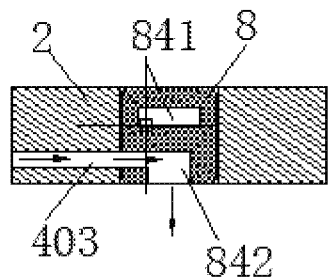

When the microvalve is at the first position state shown in FIG. 14-1 and FIG. 14-2, the third microchannel 403 communicates with the first opening 8401 of the second flow guide channel 842 of the microvalve, and the second liquid storage recess communicates with the atmosphere through the third microchannel 403, the first opening 8401, the second flow guide channel 842 of the microvalve and the second opening 8402 thereof. At this time, under the negative pressure provided by the fourth microchannel 404, the fluid in the second liquid storage recess 12 enters the fourth microchannel 404.

Figures 1, 15:
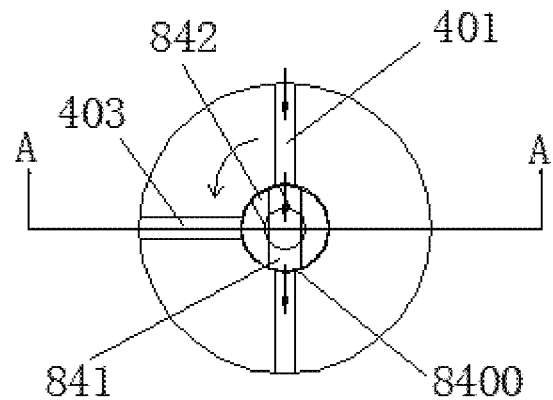
Figures 2, 15:
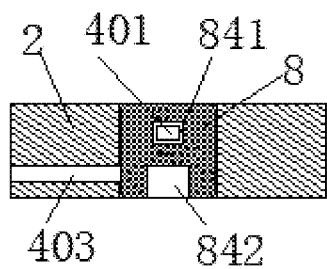

When the microvalve is at the second position state shown in FIG. 15-1 and FIG. 15-2, the third microchannel 403 does not communicate with the second flow guide channel 842, so that the atmospheric passage of the second liquid storage recess is closed. At this time, the opening 8400 of the first flow guide channel 841 is connected with the first microchannel 401, the flow path of the first microchannel 401 is opened, at this time, under the negative pressure provided by the fourth microchannel 404, the fluid in the first liquid storage recess 11 enters the fourth channel 404 through the first flow guide channel 841 on the microvalve, the second liquid storage recess 12 does not communicate with the atmosphere, so that the fluid cannot flow out.

Figures 1, 16:
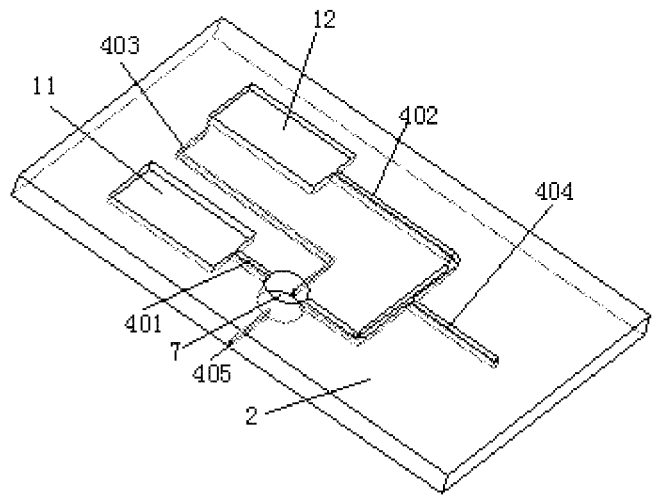
Figures 2, 16:
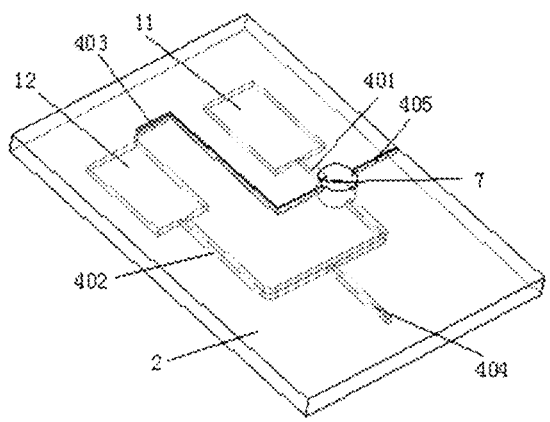
Figures 3, 16:
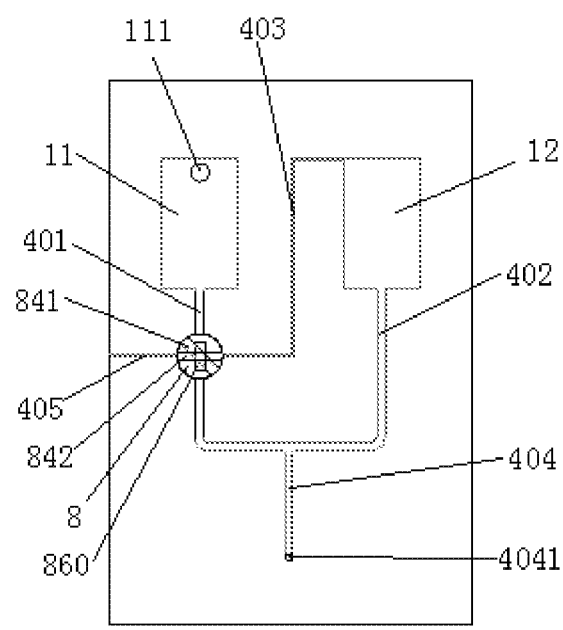

The present invention further provides a microfluidic chip and a microvalve as shown in FIG. 16-1 to FIG. 20-2. The microfluidic chip shown in FIG. 16-1 to FIG. 20-2 is basically the same as the microfluidic chip shown in FIG. 11-2 to FIG. 13 except that the microfluidic chip further includes a fifth microchannel 405 and different flow guide channels of the microvalve 8. As shown in FIG. 16-1 to FIG. 16-3, the fifth microchannel 405 is disposed on the lower side face of the substrate 2, the fifth microchannel 405 neither runs through the upper side face of the substrate, nor is directly connected with the first liquid storage recess 11, the second liquid storage recess 12 or the microchannels 401, 402, 403, 404. The opening at one end of the fifth microchannel 405 faces the microvalve insertion hole 7, and the opening at the other end is formed in the side face of the substrate to communicate with the atmosphere. When the microvalve 8 in the insertion hole is at a certain position (first position), the opening of the fifth microchannel 405 forms butt joint with and communicates with the second opening 8402 of the second flow guide channel 842 of the microvalve, and the opening of the third channel 403 forms butt joint with and communicates with the first opening 8401 of the second flow guide channel 842 of the microvalve.

Figure 17:
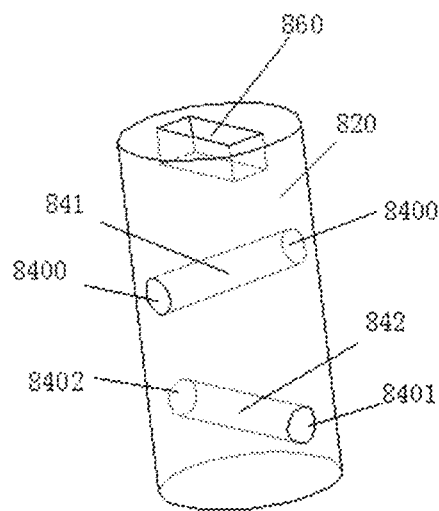
FIG. 17 is another microvalve structure.
Figures 1, 18:
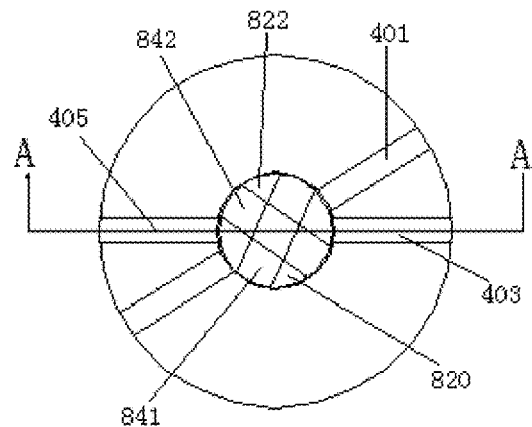
Figures 2, 18:
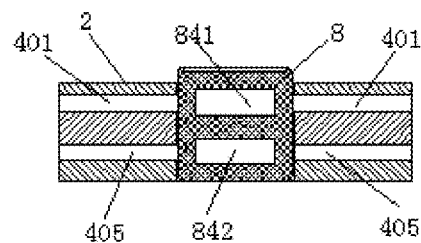

At the same time, the microvalve 8 shown in FIG. 17 includes a valve body 820, a first flow guide channel 841 and a second flow guide channel 842, the first flow guide channel and the second flow guide channel are disposed in staggered layers without crossing, and specifically, the projections of the first flow guide channel and the second flow guide channel cross each other. The first flow guide channel 841 is horizontally disposed throughout the valve body, the openings 8400 at both ends thereof are formed in the side wall of the valve body, and when the microvalve is located at a certain position (second position), the opening 8400 of the first flow guide channel 841 is connected with the first microchannel 401, so that the first microchannels separated by the microvalve communicate with each other through the first flow guide channel 841. The second flow guide channel 842 is also horizontally disposed throughout the valve body, and is not located on the same horizontal plane as the first flow guide channel, the openings 8401, 8402 at both ends thereof are formed in the side wall of the valve body, and when the microvalve is located at a certain position (first position), but not when the first microchannel 401 is connected, one of the openings 8401 of the second flow guide channel 842 communicates with the third microchannel 403, and the other opening 8402 communicates with the fifth microchannel 405 of the microfluidic chip. At this time, the ambient atmosphere can enter the fifth microchannel through the opening of the fifth microchannel 405 connected with the atmosphere, and enter the second liquid storage recess after passing through the second flow guide channel. Specifically:

When the microvalve is at the initial position state shown in FIG. 18-1, the first microchannel 401, the third microchannel 403 and the fifth microchannel 405 are blocked by the non-flow guide portion 822 of the microvalve and are all located in the closed state, at this time, in the negative pressure environment (the pump at the fourth channel 404 or other power devices that can provide negative pressure are turned on), since the second liquid storage recess 12 does not communicate with the outside and is in vacuum, the liquid in the second liquid storage recess 12 cannot flow, while the first microchannel of the first liquid storage recess is blocked by the piston, so that the fluid in the first liquid storage recess cannot flow to the fourth channel neither.

Figures 1, 19:
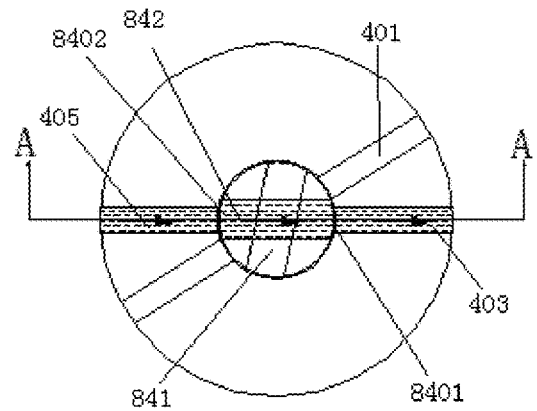
Figures 2, 19:
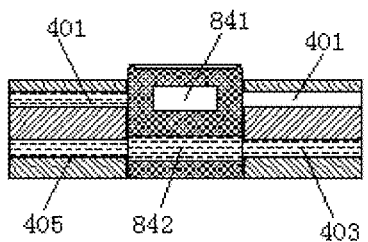

When the microvalve is at the first position state shown in FIG. 19-1, the fifth channel communicates with the opening of the second flow guide channel 842, and the second flow guide channel communicates with the third microchannel 403, so that the second liquid storage recess communicates with the atmosphere. At this time, under the negative pressure provided by the fourth microchannel 404, the fluid in the second liquid storage recess 12 enters the fourth microchannel 404.

Figures 1, 20:
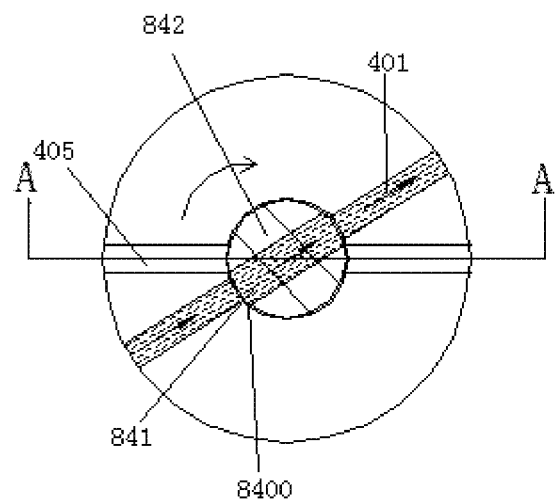
Figures 2, 20:
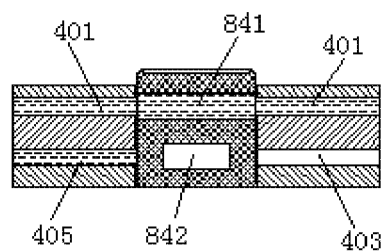

When the microvalve is at the second position state shown in FIG. 20-1, the fifth microchannel 405 does not communicate with the second flow guide channel 842, so that the atmospheric passage of the second liquid storage recess is closed. At this time, the opening 8400 of the first flow guide channel 841 is connected with the first microchannel 401, the flow path of the first microchannel 401 is opened, at this time, under the negative pressure provided by the fourth microchannel 404, the fluid in the first liquid storage recess 11 enters the fourth channel 404 through the first flow guide channel 841 on the microvalve.

Figure 12:
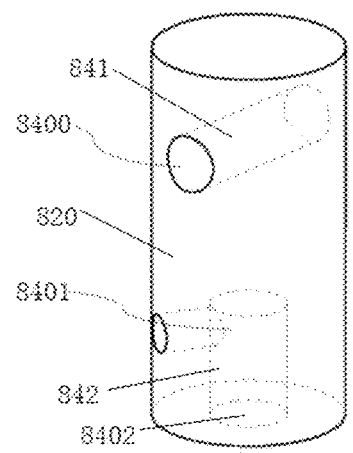
FIG. 12 is a schematic diagram of the microvalve structure in the microfluidic chip in FIG. 11-1.

In comparison, the microvalve shown in FIG. 12 has better performance than the microvalve shown in FIG. 17. Since the opening of the second channel of the microvalve shown in FIG. 12 is located on the bottom surface or top surface of the valve body, it can directly communicate with the atmosphere, which can still ensure that the second flow guide channel always communicates with the atmosphere while reducing the installation accuracy. The microvalve shown in FIG. 17 needs to be docked with the fifth microchannel on the microfluidic chip to communicate with the atmosphere, therefore, the installation accuracy of this type of microfluidic chip must be very high, if the installation error exceeds a certain range, it is possible that the opening of the second flow guide channel cannot be accurately docked with the fifth microchannel during use, which directly leads to the inability of the atmosphere to enter the second flow guide channel.

For most in vitro diagnosis products, it is a very important step to calibrate the instrument with the calibration liquid (quality control liquid or standard liquid) before detecting the sample to be tested. In one embodiment in which the microfluidic chip with the microvalve of the special structure according to the present invention is used for sample detection, the first liquid storage recess 11 is used for storing a fluid sample to be tested, and a fluid (for example, the standard liquid, a detection reaction reagent or the like) is stored in the second liquid storage recess 12 in advance. When the upper cover plate is attached to the upper side face of the substrate, both the first liquid storage recess and the second liquid storage recess form closed cavities. The upper cover plate 62 is provided with a sample adding hole 111 at a position relative to the first liquid storage recess 1, so that an external fluid sample can enter the first liquid storage recess 11 through the sample adding hole 111. Firstly, the microvalve is rotated to a state in which the second liquid storage recess is allowed to communicate with the atmosphere, under the negative pressure provided by the fourth microchannel 404, the standard liquid in the second liquid storage recess 12 is sucked into a detection area to calibrate the detector. After the calibration is completed, the microvalve is rotated to a state in which the microchannel 401 is communicated, at this time, the first liquid storage recess communicates with the fourth microchannel 404, and the sample liquid to be tested in the first liquid storage recess enters the detection area to complete the detection. The possibility of mutual contamination of fluid in different liquid storage recesses is avoided by using the misalignment design of the flow guide channels in the microvalve. At the same time, the flow of the fluid in the liquid storage recesses can also be controlled by changing the connection and disconnection state of the pre-atmosphere.

The flow guide channel on the microvalve can be in the form of an annular groove surrounding the outer wall of the piston and can also be in the form of a through hole running through the piston. The way of disposing the flow guide channel on the piston includes, but is not limited to, the above two ways. The microvalve can move in the microfluidic chip under the action of the external force, so that the microchannel can be blocked or opened through the movement of the microvalve, the movement manner includes, but is not limited to, upper and lower displacement achieved by pressing the microvalve or rotational movement. In one embodiment, the microvalve 8 further includes a force receiving portion, for example, but not limited to the concave force receiving portion 860 shown in FIG. 17, for example, a rotating mechanical arm can be combined with the force receiving portion 860 to accurately drive the microvalve 8 to move.

The shape of the cross section of the flow guide channel of the microvalve can be selected from suitable shapes, such as a circle, a square, a racetrack, an ellipse or a diamond.

The material of the microvalve 8 can be plastic, rubber, hydrogel or a certain elastic polymer material. It can also be formed by wrapping any one of the above materials with another material with relatively high hardness. By using the elastic material, the piston fills the microvalve insertion hole in an interference manner and seals the same.

Both the substrate and the cover plate can be made of any one or two of the following mixed materials, such as silicon, ceramics, glass and plastic, wherein the plastic is selected from acrylonitrile-butadiene-styrene copolymer (ABS), cycloolefin billet polymer (COP), polyamide (PA), polybutylene terephthalate (PBT), polycarbonate (PC), polydimethylsiloxane (PDMS), polyethylene (PE), polyethylene acetone (PEEK), polyethylene glycol terephthalate (PET), polymethyl methacrylate (PMMA), polyoxymethylene (POM), polypropylene (PP), polystyrene diethylene (PPE), polystyrene (PS), polystone (PSU), polytetrafluoroethylene (PTFE), etc.

The substrate and the cover plate can be combined together in any manner such as hydrogen bonding, chemical bonding, hot pressing, adhesive bonding, or double-sided tape bonding formed by surface modification and compression.

The depth of the microchannel on the microfluidic chip is 0.1-5 mm, and the width thereof is 0.1-5.0 mm.

The microchannels and the liquid storage recesses or the like on the microfluidic chip can be processed on the outer surface of the substrate, and then the substrate is covered with the cover plate to form a sealed space where the fluid can be stored. The microchannels and the liquid storage recesses or the like on the microfluidic chip can also be processed in the substrate to form a space where the fluid can be stored, so that there is no need to cover with the cover plate to form the closed space where the fluid can be stored.

The microvalve insertion hole, the microchannels and the flow guide channels can all be processed by any manner such as micromachining or machining or the like.

The sealing, releasing and resealing of the fluid in the microfluidic chip are achieved by the movement of the microvalve in the valve hole, and are achieved by using different structural parts of the same piston. The fluid circulates in the microchannel under the action of the external force. The type of the external force that provides the circulation of the fluid can be gravity, centrifugal force, aerodynamic force, surface tension, etc.

What is claimed is:

1. A microfluidic chip, comprising:
    a substrate and a cover plate, wherein
        the substrate is provided with a first liquid storage recess, a second liquid storage recess, and a microvalve insertion hole,
        a first microchannel is disposed in the substrate, wherein the microvalve insertion hole interrupts the first microchannel into a first microchannel segment proximal to the first liquid storage recess and a second microchannel segment distal to the first liquid storage recess,
        a second microchannel is disposed in the substrate,
        a third microchannel is disposed in the substrate,
        a microvalve is located in the microvalve insertion hole, wherein the microvalve comprises a valve body, a first flow guide channel, and a second flow guide channel, and wherein the first and second flow guide channels do not fluidly communicate with each other,
    wherein
        the first microchannel segment of the first microchannel comprises a first end directly fluidly connected with the first liquid storage recess a second end directly fluidly connected with the microvalve insertion hole, and the second microchannel segment of the first microchannel comprises a third end directly fluidly connected with the microvalve insertion hole, and a fourth end fluidly connected to a first end of the second microchannel,
        the second microchannel comprises a second end directly fluidly connected with the second liquid storage recess,
        the third microchannel comprises a first end directly fluidly connected with the second liquid storage recess and a second end of the third microchannel is directly fluidly connected with the microvalve insertion hole,
        the microvalve is configured and arranged such that the rotational position of the first flow guide channel regulates fluid communication between the first liquid storage recess and the fourth end of the first microchannel, the rotational position of the second flow guide channel regulates fluid communication between the second liquid storage recess and the ambient atmosphere via the third microchannel, and the fourth end of the first microchannel is fluidly connected to the second storage recess via the second microchannel irrespective of the rotational position of the microvalve.

2. The microfluidic chip according to claim 1, wherein the microvalve has at least three position states in the chip; the first state is: the first flow guide channel de is not in fluid communication with the first microchannel, and the second flow guide channel is not in fluid communication with the third microchannel; the second state is: the first flow guide channel is in fluid communication with the first microchannel, and the first opening of the second flow guide channel is not in fluid communication with the third microchannel; and the third state is: the first flow guide channel is not in fluid communication with the first microchannel, and the second flow guide channel is in fluid communication with the third microchannel.

3. The microfluidic chip according to claim 2, further comprising a fourth microchannel, wherein the fourth end of the first microchannel and the first end of the second microchannel are each fluidly connected to a first end of a fourth microchannel, and a second end of the fourth microchannel is operably connected to a negative pressure device.

4. The microfluidic chip according to claim 1, wherein the second flow guide channel has a turning design in the valve body, whereby a first end of the second flow guide channel and a second end of the second flow guide channel are respectively located on different surfaces of the valve body.

5. The microfluidic chip according to claim 4, wherein first and second ends of the first flow guide channel are formed in a side wall of the valve body; and the first end of the second flow guide channel is formed in the side wall of the valve body, and the second end of the second flow guide channel is formed in a bottom surface or top surface of the valve body, and is not used for communicating with the microchannels in the chip.

6. The microfluidic chip according to claim 4, wherein the turning design takes the shape of "7".

7. The microfluidic chip according to claim 1, wherein the first flow guide channel and the second flow guide channel are disposed in staggered layers within the substrate without crossing, first and second ends of the first flow guide channel are formed in a side wall of the valve body, and a first end or a second end of the second flow guide channel is formed in the side wall of the valve body.

8. The microfluidic chip according to claim 1, further comprising a fourth microchannel, wherein the fourth end of the first microchannel and the first end of the second microchannel are each fluidly connected to a first end of the fourth microchannel, and a second end of the fourth microchannel is operably connected to a negative pressure device.

* * * * *